United States Patent [19]

Sewell

[11] Patent Number: 4,790,658
[45] Date of Patent: Dec. 13, 1988

[54] DITHER SIGNAL REMOVER FOR A DITHERED RING LASER ANGULAR RATE SENSOR

[75] Inventor: Wesley C. Sewell, Dunedin, Fla.

[73] Assignee: Honeywell Inc., Minneapolis, Minn.

[21] Appl. No.: 738,141

[22] Filed: May 24, 1985

[51] Int. Cl.$^4$ ............................................. G01C 19/64
[52] U.S. Cl. .................................................... 356/350
[58] Field of Search ........................................ 356/350

[56] References Cited

U.S. PATENT DOCUMENTS 4,248,534  2/1981  Elbert ................................. 356/350
4,344,706  8/1982  Ljung et al. ........................ 356/350
4,610,543  9/1986  Ferriss ............................... 356/350

Primary Examiner—Vincent P. McGraw
Assistant Examiner—S. A. Turner
Attorney, Agent, or Firm—Robert A. Pajack

[57] ABSTRACT

Readout signals of a dithered ring laser angular sensor are processed by a signal combining circuit which forms part of a closed-loop dither signal remover scheme. The output of the signal combining circuit is demodulated as a function of the dither applied to the ring laser sensor and subsequently utilized to control a correction signal. The signal combining circuit combines the readout signal and the correction signal to yield an output signal stripped of substantially any dither signal components.

4 Claims, 6 Drawing Sheets

| DESCRIPTION | | | P | N | UP | DN | E4 | E3 | E2 | E1 | VALUE₁₀ |
|---|---|---|---|---|---|---|---|---|---|---|---|
| NO INPUTS | | | 1 | 0 | 0 | 1 | 0 | 0 | 0 | 0 | 0 |
| | | DN | 1 | 0 | 0 | 0 | | | | | |
| | | UP | 1 | 0 | 1 | 1 | | | | | |
| P | | | 0 | 0 | 0 | 1 | 1 | 1 | 1 | 1 | -1 |
| P | AND | DN | 0 | 0 | 0 | 0 | 1 | 1 | 1 | 0 | -2 |
| P | AND | UP | 0 | 0 | 1 | 1 | 0 | 0 | 0 | 0 | 0 |
| N | | | 1 | 1 | 0 | 1 | 0 | 0 | 0 | 1 | 1 |
| N | AND | DN | 1 | 1 | 0 | 0 | 0 | 0 | 0 | 0 | 0 |
| N | AND | UP | 1 | 1 | 1 | 1 | 0 | 0 | 1 | 0 | 2 |

Fig. 10

DITHER SIGNAL REMOVER FOR A DITHERED RING LASER ANGULAR RATE SENSOR

FIELD OF THE INVENTION

This invention relates to laser angular rate sensors and specifically to sensors in which a dithering bias is used to obviate the effects of lock-in inherent in such sensors.

BACKGROUND OF THE INVENTION

The behavior of ring laser angular rate sensors is well understood by those skilled in the art. Inherent in such sensors is the phenomena known as lock-in in which counter-propagating laser beams tend to lock together to a common frequency. The lock-in phenomenom causes performance errors which have deleterious effects in navigational systems.

To avoid or reduce the effects of lock-in, the laser angular rate sensor may be biased by dithering techniques such as those shown and described in U.S. Pat. No. 3,373,650 issued in the name of J. E. Killpatrick and assigned to the assignee of the present invention. The biasing technique usually referred to as dithering may be implemented in a variety of ways including electro-optical and mechanical schemes. Since these biasing techniques directly affect the behavior of the counter-propagating laser beams, the sensor readout contains not only rate information signals but also contains a signal component directly related to the biasing of the sensor. This is true whether the readout is mounted directly on the sensor (block mounted) or off of the sensor (case mounted) like that shown in the aforementioned patent. The signal contribution in the readout signal due to dither is herein referred to as the dither signal component. For low noise navigational systems, the dither signal component in the readout signal usually must be minimized or removed to avoid control problems.

Prior art solutions to remove the dither signal component include notch filters. However, such notch filters generate gain and phase shift disturbances which can affect the stability of control loops. The desirable solution is to remove the dither signal component by generating a correction signal which is substantially equivalent to the dither signal component. This latter approach is taught in U.S. Pat. No. 4,344,706 issued to Ljung et al. Ljung teaches the use of a tracking circuit for tracking the clockwise and counterclockwise components of dither rotation. These dither components are subtracted from the usual readout signal which is responsive to the counter-propagating laser beams of the sensor thereby providing a corrected readout output signal.

BRIEF DESCRIPTION OF THE INVENTION

Readout signals of a dithered ring laser angular sensor are processed by a signal combining circuit which forms part of a closed-loop dither signal remover scheme. The output of the signal combining circuit is demodulated as a function of the dither applied to the ring laser sensor and subsequently utilized to control a correction signal. The signal combining circuit combines the readout signal and the correction signal to yield an output signal stripped of substantially any dither signal components.

DESCRIPTION OF THE DRAWINGS

FIGS. 6 through 8 are truth tables detailing functions of circuit diagrams of FIGS. 2 through 5.

FIGS. 9 and 10 are timing diagrams illustrating the time behavior of the circuit diagrams of FIGS. 2 through 5.

DETAILED DESCRIPTION OF THE INVENTION

Figure 1:
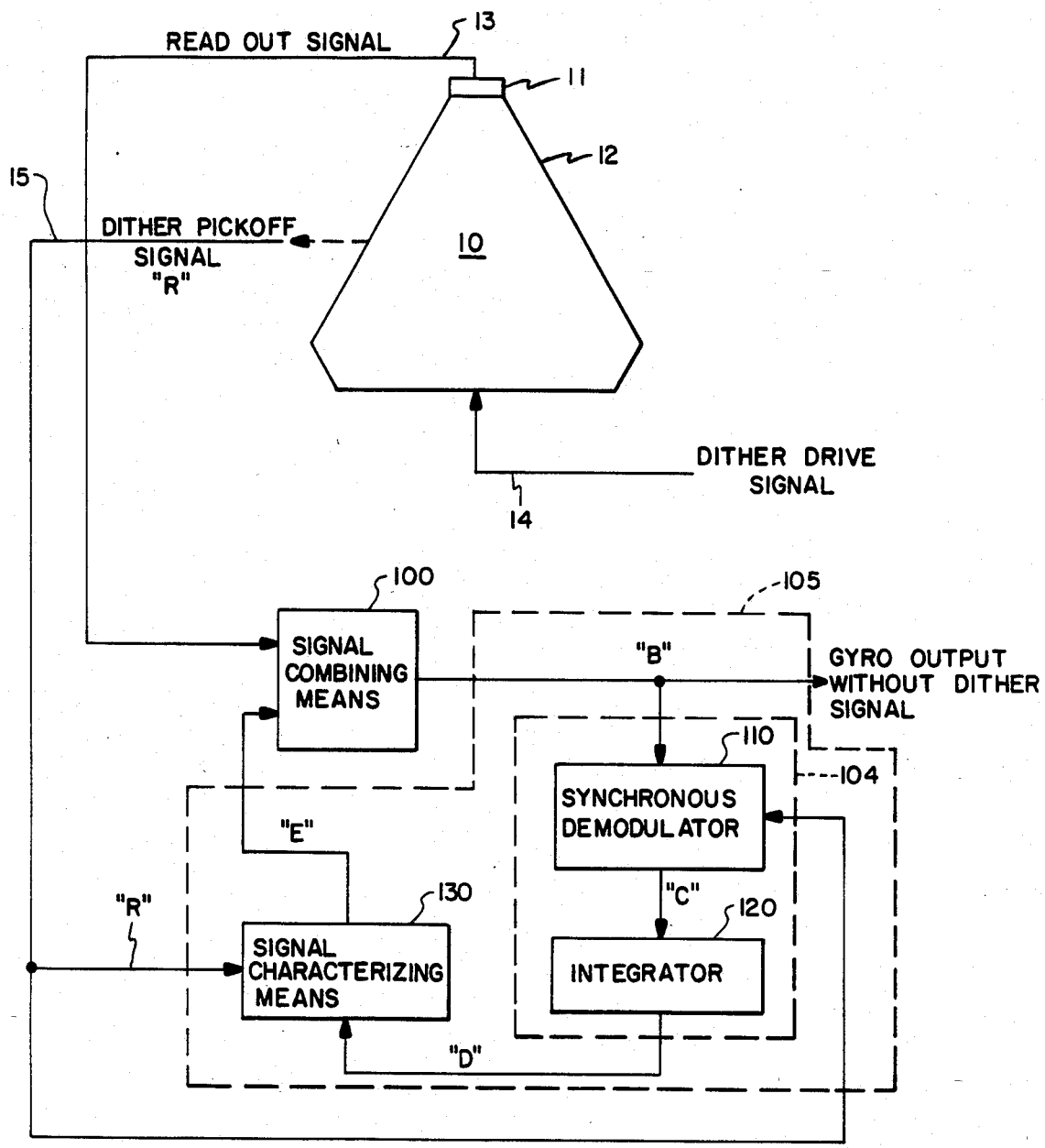
FIG. 1 is a schematic block diagram illustrating a closed-loop control scheme for removing dither signal components from a ring laser readout.

Referring now to FIG. 1, thereshown is a ring laser angular rate sensor like that shown in the aforementioned patents. Sensor 10 includes a readout mechanism 11 mounted to block 12. Block 12 provides the propagation path for counter-propagating laser beams. Readout 11 is responsive to a portion of the counter-propagating laser beams and provides a signal 13 representative of the frequency difference between the beams as will subsequently be described in further detail. Sensor 10 is also provided with a dither drive signal 14 providing the dither or bias as previously described. For example, block 10 may be rotationally oscillated, as shown in the aforementioned patent. A dither spring having piezoelectric devices attached thereto causes the spring to flex and cause block 12 to rotationally oscillate. Furthermore, a piezoelectric device may also be attached to the spring for providing an output signal 15 identified as signal "R" directly related to the actual dither applied to the sensor. The just mentioned piezoelectric output signal "R" is sometimes referred to as the "dither pick-off signal". Herein this signal is referred to as the dither reference signal having phase and amplitude related to the dither applied to the sensor. The dither reference signal may be obtained by a variety of techniques depending upon the dither scheme that is selected (i.e. optical or mechanical).

It should be noted that a diagram similar to FIG. 1 would be appropriate for describing an electro-optical biasing system including a Faraday cell, and the like.

Readout 11 generally includes a means for combining a portion of each of the counter-propagating laser beams to generate an interference pattern. Readout 11 usually includes at least one photodetector responsive to the interference pattern for providing an output signal indicative of the intensity of the fringe pattern passing the detector. The photodetector output signal may be signal processed to count the number of fringe changes passing the detector.

As is well known, the output signal of a single photodetector is insufficient to determine fringe movement direction, i.e. sensor rotation direction. Therefore, another means is required to provide a signal indicative of rotation direction.

Having at least one photodetector signal and a direction signal is sufficient to determine angular rate and rotation angle information. In FIG. 1, signal 13 is any one or more signals sufficient to indicate and determine sensor rotation by subsequent signal processing.

Herein, the detector signal or readout signal is a series of pulses which, if integrated (counted), gives a signal indicative of the angular rotation of the sensor at any instant, and the rate of change of the fringe changes is a signal indicative of the rate of rotation of the sensor. In the detailed embodiments described below, signal 13 by way of example is a pair of signals where one signal is a series of pulses indicating sensor rotation in one direction, and the other signal is a series of pulses indicating rotation in the other direction. These pulses may then be separately counted and the difference being indicative of rotation direction. An alternative is to have a single signal line having a series of pulses which are presented to an up/down counter controlled by a sensor direction signal. There are, of course, a variety of implementations to provide the intended function of signal 13. Nevertheless, signal 13 will include, in any implementation, a dither signal component.

It should be understood that either mechanical or optical biasing of the counter-propagating laser beams directly affect the number and rate of fringe changes passing the photodetector, and so directly affect readout signal 13. Therefore, the observed rotation rate and the rotation angle are directly affected by dithering due to the dither signal component.

The apparatus shown in FIG. 1 provides a closed-loop system for removing the dither signal contribution or component from the sensor readout signal and obtaining a sensor output signal substantially devoid of a dither signal component due to dithering. Thereshown is a signal combining means 100 for combining the sensor readout signal 13 and a correction signal identified by the letter "E". The output of signal combining means 100, as will be described, is defined as the sensor output signal and is designated as signal B. Signal B is characteristic of the difference between the readout signal and the correction signal thereby providing a sensor output signal having any dither signal component substantially removed. Signal combining means 100 performs essentially a subtraction function so as to subtract signal E from signal 13.

The output of signal combining means 100 is presented to a correction signal means 105 including synchronous demodulator 110, integrator 120, and signal characterizing means 130. Correction signal means 105 in combination with signal combining means 100 provides a negative feedback closed-loop control system for generating a correction signal substantially equivalent to the dither component in the readout signal. In these circumstances, the sensor output signal will be substantially devoid of any signal component due to sensor dithering.

Referring to FIG. 1, the sensor output signal B is presented to an error signal means 104 including synchronous demodulator 110 which has as a second input the dither reference signal, R, having magnitude and phase representative of the dithering or biasing of the sensor. Synchronous demodulator 110 provides an output signal "C" representative of the dither signal components contained in signal B. Output signal C is subsequently integrated by integrator 120 and the output thereof, signal D, presented to signal characterizing means 130 as will be further described.

Signal characterizing means 130 generates a correction signal E in relation to the dither reference signal R in accordance with the gain control signal D provided by the output of integrator 130 which controls the relationship between signal E and signal R.

The invention, as illustrated in FIG. 1, automatically adjusts the relationship between correction signal E and dither reference signal R such that the sensor signal B is substantially devoid of any dither signal component. Synchronous demodulator 110 is generally a noisy signal with a DC value equal to the magnitude of any dither signal component in the sensor output signal B which is in phase with the dither reference signal and negative if it is out of phase. The output of the synchronous demodulator is then integrated with a very high gain integrator 120 having a selected time constant. The integrator then filters the noise and produces a "steady" signal which is subsequently presented to signal characterizing means 130 for adjusting the relationship between correction signal E and the input dither reference signal R. In its simplest terms, signal characterizing means 130 functions as an amplifier/multiplier having a gain determined by signal D for essentially reproducing the dither reference signal having a characteristic as that contained in the readout signal. In closed-loop operation signal E continues to change until it is substantially equal to the dither signal component in the readout signal 13.

Figure 2:
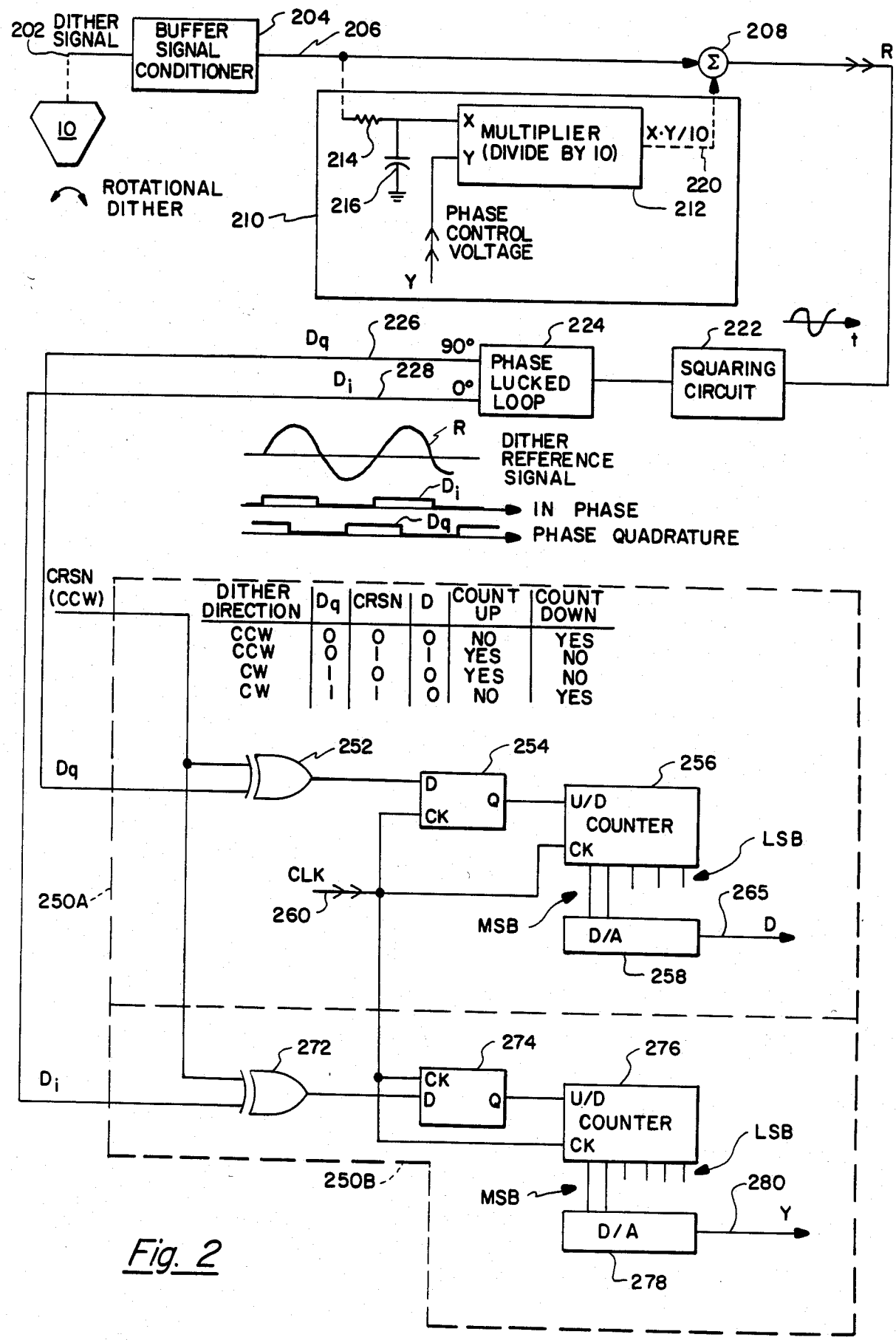
FIGS. 2 through 5 are schematic diagrams further detailing a block diagram of FIG. 1.

FIGS. 2-10 show further details of the implementation of the invention depicted in FIG. 1. Referring to FIG. 2, rotationally oscillated sensor 10 provides an output dither signal 202 which is passed through a buffer/signal conditioner 204 having output 206 presented as one input to summing circuit 208. The output of summing circuit provides the dither reference signal R. A second input to summing circuit 208 is provided by the output of phase control circuit 210 which serves to adjust the phase of signal R in response to a phase control voltage signal "Y". The phase control circuit 210 includes a four quadrant analog multiplier 212 having an output as the product of inputs "X" and "Y". The X input is the output of the buffer signal conditioner 204 passed through a 90 degree phase shifting network comprised of resistor 214 and capacitor 216. The output 220 of multiplier 212 is presented as a second input to summing circuit 208. In operation, the phase control voltage presented to the input Y of multiplier 212 is capable of adjusting the phase of the dither reference signal R in the order of ±20 degrees.

Dither reference signal R is passed through a squaring circuit 222 and presented to a phase locked loop circuit 224. Phase locked loop circuit 224 serves to provide a pair of signals, identified as signal lines 226 and 228, in phase quadrature with frequency locked to dither reference signal R. The signal on line 226 is indicated by "Dq" and the signal on signal line 28 is identified as signal "Di". Noted in FIG. 2 are timing diagrams relating signals R, Di, and Dq.

The time derivative of signal R represents the direction of rotational dither of sensor 10.

Accordingly, signal Dq, which is a signal in-phase quadrature with the sign of signal R, represents the rotation direction of the rotational dither.

Circuit means 250A shows details of demodulator 110 and integrator 120 forming control signal means 104 shown in FIG. 1 to generate a control signal to drive any dither signal components in the sensor readout toward a minimum. Circuit means 250A includes exclusive-OR gate 252, D-type flip-flop 254, up/down counter 256 and digital to analog converter 258. Exclusive-OR gate 252 has as inputs signal Dq and a sensor output signal identified as "SN". Signal SN by way of example is a stream of pulses indicative of motion in the counterclockwise (CCW) direction of sensor 10. The output of exclusive-OR gate 252 is presented to the D-input of flip-flop 254, the output of which is presented to the up/down control input of counter 256. A 5 MHz synchronizing clock signal 260 is presented to both flip-flop 254 and counter 256 and other circuit components as will be described. Digital outputs of counter 256 are presented to D/A converter 258 having an output signal "D" on signal line 265. As illustrated, the D/A converter 258 output signal 265 is representative of the digital value of some of the more significant bits of counter 256. In this manner, a very long integrator time constant may be achieved.

Circuit means 250B is another control signal means like that of circuit means 250A. Circuit means 250B includes exclusive-OR gate 272, D-type flip-flop 274, up/down counter 276, and digital to analog converter 278 having an output signal "Y" on signal line 280. Circuit means 250B is similar to circuit means 250A except that exclusive-OR gate 272 is responsive to the inputs SN and the in-phase dither reference signal Di. The output signal Y is the phase bias control as will be explained in further detail below.

Figure 3:
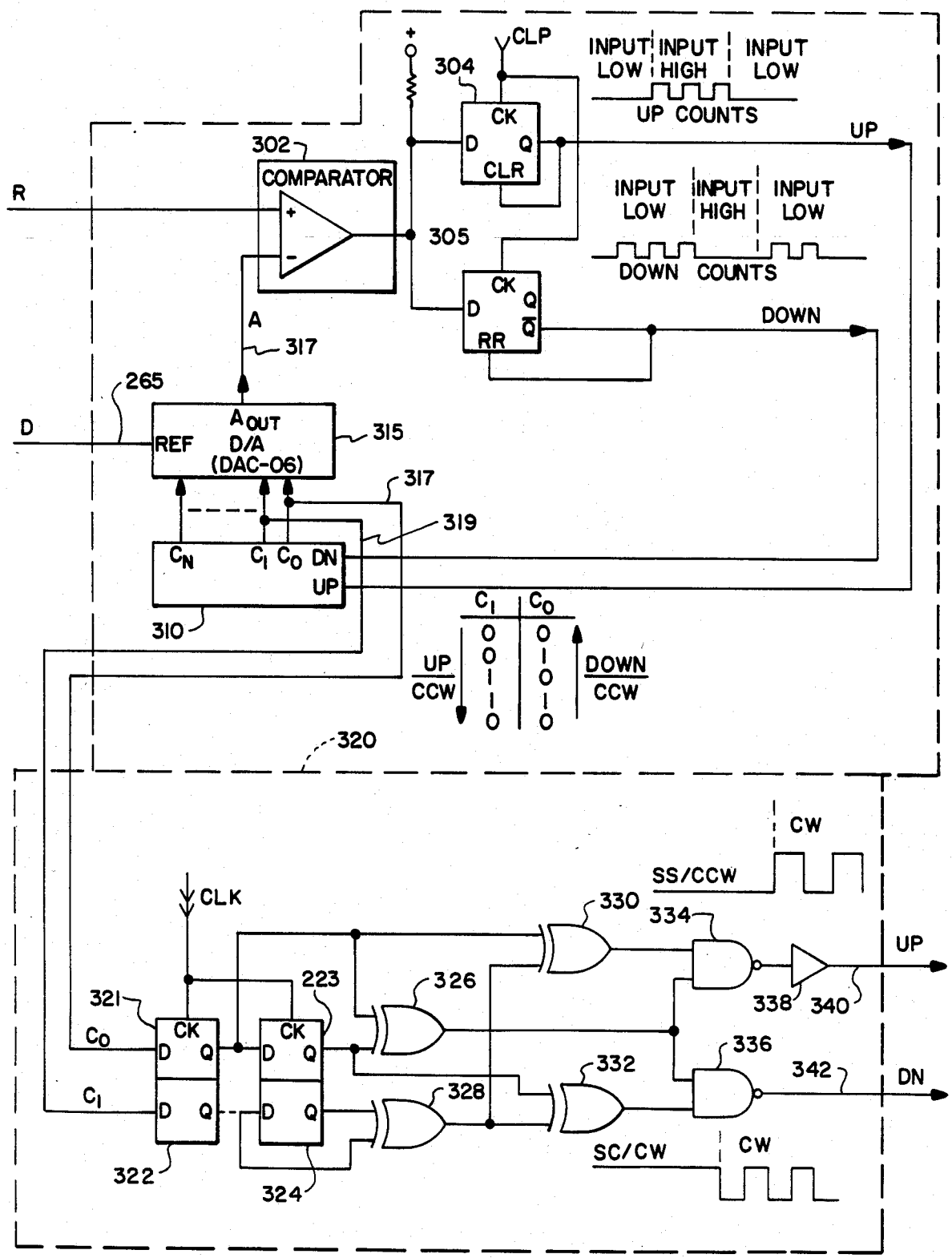

FIG. 3 illustrates a schematic block diagram for the correction signal characterizing means 130 of FIG. 1. It should be noted that all flip-flops indicated in the drawings are of the type-D variety, and each flip-flop is clocked by a common clock signal. In FIG. 3, dither reference signal R is presented to comparator 302 having an output connected to flip-flops 304 and 305.

Comparator 302 provides an output dependent upon the signal comparison between signal R presented at its positive input and analog reference signal A presented to its negative input. The output of flip-flop 304 provides a series of UP-COUNTS or clocked output pulses whenever signal R is greater than the reference signal A. In a similar fashion, flip-flop 305 provides a series of clocked output pulses whenever dither reference signal R is less than analog reference signal A.

The Q-output of flip-flop 304 is presented to the up-input of up/down counter 310, and the NOT-Q output of flip-flop 305 is connected to the down-input of counter 310. Counter 310, by way of example, may be a plurality of synchronously operated four bit up/down counters such as a LS193 or SN74193. The digital representation of the count of counter 310 is presented to a digital to analog converter 315 having analog output on signal line 317 identified as signal "A", the analog reference signal. D/A converter 315 may be provided, by way of example, a DAC-06 converter manufactured by Analog Devices. Converter 315 includes a reference input 316 which receives signal D provided by the output of D/A converter 258 on signal line 265 of FIG. 2. As will be further described, the D/A converter 315 reference input controls the relationship between the digital input and the analog output voltage of D/A converter 315.

The least and the least-plus-one bits of counter 310, identified as $C_0$ and $C_1$ are presented on signal lines 317 and 319, respectively. Signal lines 317 and 319 are presented to a gating circuit 320 including flip-flops 321, 322, 323, and 324, exclusive-OR gates 326, 328, 330, 332, and NAND gates 334 and 336, and inverter 338. Flip-flops 321 and 322 act as a buffer. The states of inputs $C_0$ and $C_1$ are transferred to flip-flops 323 and 324, respectively. Exclusive-OR gates 326 and 328 compare the D and Q signals of flip-flops 323 and 324, respectively. Exclusive-OR gate 330 compares the D-input of flip-flop 323 and the output of exclusive-OR gate 328. Exclusive-OR gate 332 compares the Q-output of flip-flop 323 and the output of exclusive-OR gate 328. NAND gate 324 performs the NAND function on the outputs of exclusive-OR gates 330 and 326, and NAND gate 326 performs the NAND function of the outputs of exclusive-OR gates 326 and 332. The output of NAND gate of 334 is passed through an inverter 338 having output signal line 340 identified by signal "UP". The output of NAND gate 326 has signal line 342 identified by signal DN.

The correction signal characterizing means 130 illustrated in FIG. 3 serves to provide correction signals UP and DN, in response to the dither reference signal R and the gain control signal D, which are substantially equivalent to the dither signal component in the readout signal as will be more fully described.

It should be noted that bits $C_0$ and $C_1$ are defined to be a binary number which increases or decreases by one except at the 11-00 transition. Further, the binary number $C_1C_0$ increases on an up-count of counter 310 and is defined to correspond to CW dither rotation.

Figure 4:
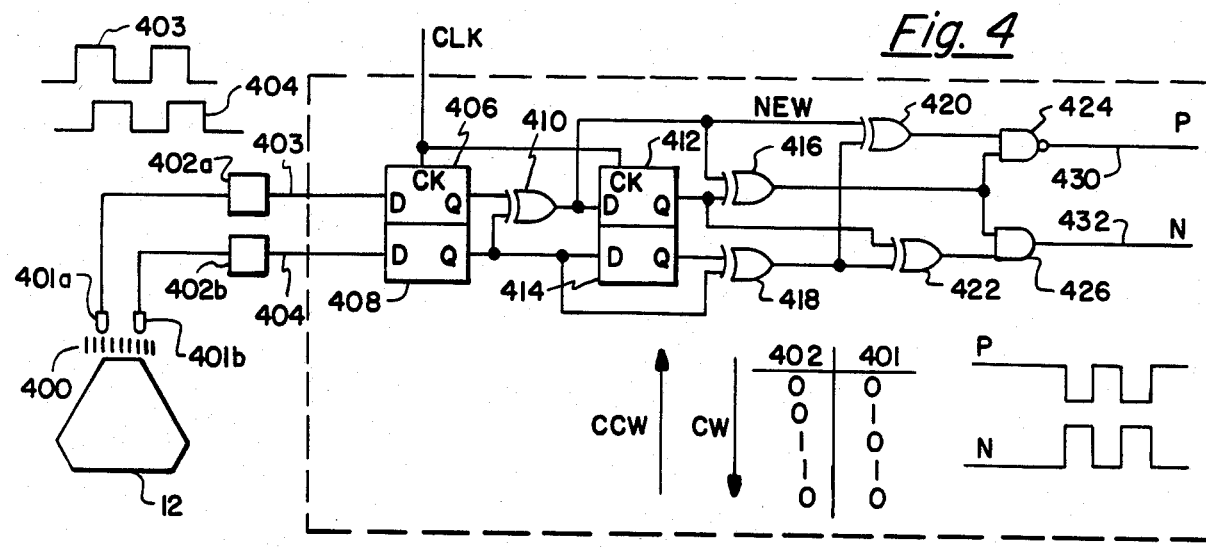

Shown in FIG. 4 is a further detailed description of the readout 11 shown in FIG. 1. As discussed earlier, a count of the interference fringe changes is an indication of the rotation angle. The counts are obtained by utilizing a photodetector responsive to the intensity of the interference pattern. However, photodetector measurements alone do not give an indication of rotation direction. Therefore, a pair of photodetectors 401a and 401b are commonly employed to be responsive to interference fringe pattern 400 outside of block 12. These photodeetectors are placed relative to the interference pattern so as to produce output signals which are in phase quadrature. From these signals, direction can be determined. Further, as illustrated in FIG. 4, enhanced resolution above a single count can be obtained as illustrated in FIG. 4. In FIG. 4, the phase quadrature readout signals are processed so as to produce a first readout signal "P" which produces a single pulse for each one quarter of an interference fringe pattern passing either one of the readout photodetectors for rotation in one direction, and provides a second signal readout signal "N" which produces a single pulse for each one quarter of an interference fringe passing either photodetector for rotation in a second direction. Herein, P pulses occur for CW sensor rotation and N pulses for CCW rotation.

Referring to FIG. 4, the output of each photodetector 401a and 401b is passed through squaring circuits 402a and 402b to provide readout phase quadrature signals 403 and 404, respectively. Signals 403 and 404 are squared so as to provide digital inputs to flip-flops 406 and 408. The Q-outputs of flip-flops 406 and 408 are presented to exclusive-OR gate 410 having an output presented to the D-input of flip-flop 412. The Q-output of flip-flop 408 is presented to the D-input of flip-flop 414.

It should be noted that the phase quadrature signals 403 and 404 are converted by exclusive-OR gate 410 to a two bit binary number or pair of signals which are the D-inputs of flip-flops 412 and 414. The binary number is identified as FG where F is the D-input to flip-flop 414, and G is the D-input to flip-flop 412. Exclusive-OR gate 416 compares the Q-output and the D-input of flip-flop 412, and exclusive-OR gate 418 compares the Q-output and D-input of flip-flop 414. Exclusive-OR gate 420 compares the output of gate 418 and the D-input of flip-flop 412. Exclusive-OR gate 422 compares the output of exclusive-OR gate 418 and the Q-output of flip-flop 412. NAND gate 424 performs the NAND function on the output of exclusive-OR gates 420 and 416, and NAND gate 426 performs the NAND function on the outputs of exclusive-OR gates 416 and 422.

As noted in the Truth Table shown in FIG. 4, clockwise (CW) is identified as when signal F is considered the least significant bit and signal G is considered the most significant bit, and the pair of bits FG increases in binary value. Similarly, the counterclockwise (CCW) direction is when the binary value FG decreases in value. If the D-input and the Q-output of flip-flops 412 and 414 are the same at the time of a clock pulse, the output of the P signal is a high state and the output of the N signal is a low state. When the sensor is rotating in a CW direction, the binary bit pair FG will advance in binary value, and for each increasing binary value transition, an output pulse going from high to low to high will be present on signal line 430. On the other hand, in the CCW direction, pulses going from low to high to low are produced on signal line 432 for each binary value transition of the binary bit pair FG decreasing in value. Thus, the circuit of FIG. 4 provides a readout circuit means which provides a first readout signal, P, indicative of rotation in a first direction having pulses related to both the inertial rotation and dither rotation in the CW direction. Similarly, the readout circuit means provides a second readout signal, N, indicative of rotation in a second direction which has pulses related to the inertial rotation and the dither rotation in the second direction.

The readout illustrated in FIG. 4 provides two signal lines P and N for subsequent signal processing to determine rotation rate and angle in a well known manner or in accordance with the present with to provide correction of the dither signal component in signals P and N. It, nevertheless, should be recognized that a single signal line could be used with appropriate direction indication and gating logic to obtain the intended function. It should also be recognized P and N signal pulses are mutually exclusive.

Figure 5:
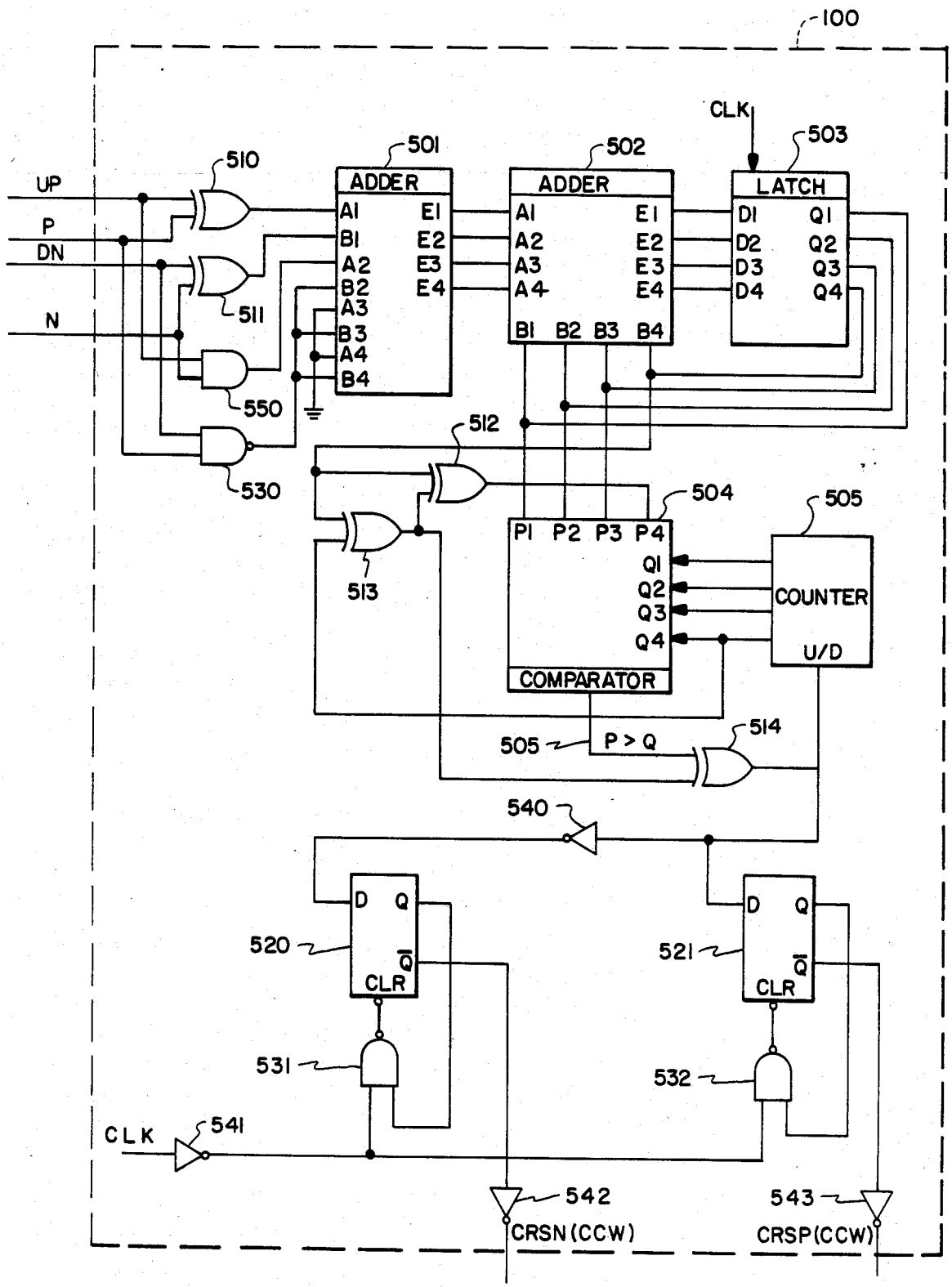

Shown in FIG. 5 is a detailed description of the signal combining means 100 illustrated in Figure 1. Assuming the digital or pulse scheme as already described, signal combining means 100 is essentially a pulse subtractor as will be described. Circuit combining means 100 includes four-bit-adders 501 and 502, four-bit-latch 503, four-bit-comparator 504, counter 505, exclusive-OR gates 510, 511, 512, 513, and 514, flip-flops 520 and 521, NAND gates 530, 531, and 532, inverters 540, 541, 542, and 543, and AND gate 550. Exclusive-OR gate 510 compares the UP signal and the P signal, and provides an output to A1 of adder 501. Exclusive-OR gate 511 compares signals DN and N and provides an output to the B1 input of adder 501. AND gate 550 performs the AND function on the UP and N signal and has an output connected to the A2 input of adder 501. NAND gate 530 has as inputs the DN and N signals and provides an output signal presented to inputs B2, B3, and B4 of adder 501. Inputs A3 and A4 of adder 501 are tied to ground. The E-outputs of adder 501 are respectively presented to the A-inputs of adder 502. The E-outputs of adder 502 are presented to the D-inputs of the clocked latches 503. The Q-outputs of latches 503 are presented as the B-inputs of adder 502. The connections of adder 502 and 503 are such that the B- signals are the E-outputs of adder 502 delayed by one clock cycle.

The Q1, Q2, and Q3 outputs of latch 503 are presented to the P1, P2, and P3 inputs of comparator 504. The outputs of a four bit counter 505 are presented to inputs Q1, Q2, Q3, and Q4 of comparator 504 where Q1 and P1 are least significant bits. Exclusive-OR gate 513 compares the Q4 bit of counter 505 and the Q4-output of latch 503. The output of exclusive-OR gate 513 is presented as one input of exclusive-OR gate 512. The remaining input of exclusive-OR gate 512 is the Q4-output of latch 503. The output of exclusive-OR gate 512 is presented to the P4 input of comparator 504. The output of comparator 504 is presented on output signal line 505 and is a high state whenever the binary value of the P-inputs is greater than the binary value of the Q-inputs. Exclusive-OR gate 514 compares signal line 505 with the output of exclusive-OR gate 513, and provides an input to the up/down counter 505, the D-input of flip-flop 520 through inverter 540, and the D-input of flip-flop 521.

Each of the flip-flops 520 and 521 are provided with a clear signal through NAND gates 531 and 532, each having as one input the Q-output of the respective flip-flop and the output of the clock signal passing through inverter 541. The Not-Q output of flip-flop 520 is passed through inverter 542 and provides a sensor signal SN corresponding to readout signal N of FIG. 4 with substantially no dither signal component. Similarly, the Not-Q output of flip-flop 521 is passed through inverter 543 providing a corrected readout signal SP corresponding to readout signal P with substantially no dither signal component. Signal SN is presented to exclusive-OR gate 552 as shown in FIG. 2.

The operation of the signal combining means illustrated in FIG. 5 will now be described. Signals P and N are the sensor readout signals which are pulses caused by movement of the interference pattern. Signal P pulses correspond to CW rotation due to inertial rotation and a dither rotation in the CW direction. Similarly, signal N corresponds to CCW rotation due to inertial rotation and dither rotation in the CCW direction. Correction signals UP and DN are intended to be identical to signals P and N in the absence of any inertial rotation. The function of signal combining means 100 is to substract the psuedo dither pulses generated by correction signals DN and UP and subtract them from the readout output signals P and N.

The Truth Table shown in FIG. 6 illustrates the intended function of circuit means 100. Logic values P and N represent sensor pulses corresponding to the CW and CCW direction. Logic values UP and DN represent psuedo dither pulses corresponding to CW and CCW dither rotation. The Table shown in FIG. 6 assumes the logic state for signals P, N, DN, and UP to be zero whenever there is no pulse. (This is not the case in the actual circuit diagrams described above.) Further, it should be understood that signal pulses on signal lines P or N are mutually exclusive, and the same is true for signal lines DN and UP. The Truth Table in FIG. 6 indicates that if there is a signal pulse P at the same time there is a pulse DN, a signal SP should produce a net two pulses. This may be understood by considering the P signal being the CW direction giving an output pulse at the same time that the dither direction was going in the opposite direction.

FIG. 7 defines a four bit binary number corresponding to the five possibilities of output counts that can occur in accordance with the Truth Table of FIG. 6. Negative numbers are in two's compliment arithmatic.

Shown in FIG. 8 is the Truth Table for the four bit output of adder 501. The logic values for P and N and UP and DN in FIG. 8 have been adjusted, compared with FIG. 6, to correspond to the logic illustrated in the Figures. For example, the steady state -no rotation- condition is one in which signals P and DN are a high state, and signals N and UP are a low state. Analysis of the Truth Table shown in FIG. 8 shows a sign reversal compared with Figure 6. For example, a P and DN logic pulse result in adder 501 yielding a −2 in two's compliment.

Nevertheless, signal combining means 100 shown in FIG. 5 is such that the two's compliment output of adder 501 results in two pulses on the SP signal lines by virtue of proper logic inversion.

The operation of the circuit illustrated in FIG. 5 to obtain sensor signals SN and SP will now be briefly described. The output of adder 501 in accordance with the Truth Table of FIG. 8 is presented to a second adder 502 which adds the output of latch circuit 503. The output of latch 503 essentially forms the computer expression:

$$B = B + A$$

Therefore, the output of latch 503 represents a continuous representation of all the counts dictated by the inputs to adder 501. The value of the P inputs to comparator 504 determines whether or not counter 505 will count up or down. For example, if the binary value P was greater than Q, counter 505 would count up until its output equals Q. The same signal which caused the counter to count up is also utilized to cause the SP output signal line to have a pulse passed through latch 521.

Note that when P is equal to Q, and assuming that the outputs of adder 501 are all zeros, counter 505 toggles up and down since the output control thereof is determined by the state of exclusive-OR gate 514 which will toggle between a high and low state. This toggling causes pulses to alternately occur on the SN and SP signal lines at the clock rate. Toggling will continue until either P increases or decreases as a function of the output of adder 501. In this manner, pulses which alternately should have occurred on the SN or SP lines will be diverted to one or the other of the signal lines in accordance with the inputs to the adder 501.

Operation of the embodiment of the invention illustrated in FIGS. 1-8 will now be described. FIG. 9 graphically depicts the operation of the embodiment of the invention. FIG. 9 illustrates timing diagrams for the dither reference signal R from the output of summing circuit 208 in FIG. 2, sensor readout signals P and N illustrated in FIG. 4, and correction signals UP and DN in FIG. 3.

Consider the situation where the sensor has zero inertial input rotation. In these circumstances output signals P and N will represent only rotation due to dithering which is represented by dither reference signal R. Graphically, the CW direction is defined as when R is rising, and the CCW direction is defined as when R is falling. If the correction signal E is perfect, then the number of pulses on signal lines P and UP are equal. Similarly, the number of pulses on signal lines N and DN are equal. In these circumstances, the output pulses on signal lines SP and SN are like that shown in FIG. 10 in region 589. That is, for each clock pulse CLK, the output pulses alternate on SP and SN. Sensor rotation electronics (not shown) count up for each pulse of sensor output signal SN, and count down for each pulse of sensor output signal SP, the net pulse count will be zero—meaning there is no inertial rotation.

In the situation where there is some CW inertial rotation, the signal combining means 100 illustrated in FIG. 5 will be like that shown in region 590 of FIG. 10. That is, the number of pulses on signal line SP exceeds those on signal line SN by a value of +2. The sensor signal processor which determines rotation will realize a net +2 pulses and indicate a corresponding rotation angle change.

The above example illustrates how the SN and SP signal pulses are used to determine the magnitude of rotation. The following exposition sets forth the closed-loop operation to maintain the correction signal E to be sufficient to remove the dither component from readout signals P and N, and provide sensor signals SN and SP having substantially no dither signal component. Briefly, closed-loop operation is obtained by (i) demodulating the sensor output signal SN by signal Dq derived from the dither reference signal and representative of dither direction; (ii) integrating the demodulated output; and (iii) adjusting the bias control which determines correction signal E until control equilibrium is achieved.

First, consider the situation during equilibrium as illustrated in FIG. 9. The SN signal line (FIG. 5) is presented to the exclusive-OR gate 252 (FIG. 2) which forms in part the synchronous demodulator including flip-flop 254. In the circumstances where a SN signal pulse exists for every other clock pulse, the Q-output of flip-flop 254 alternates in sign for each clock cycle. Accordingly, the up/down input control of counter 256 alternates. Therefore, the value of counter 256 and the gain control output on signal line 265, signal D, remain fixed in value. Accordingly, the bias control of converter 315 (FIG. 3) remains fixed, and the correction signals UP and DN remain as before. In this situation, one can consider that the correction signal E is truly locked to the dither input to the sensor and equilibrium is achieved.

Now consider the situation where there is no inertial rotation and signal E is less than the input signal. In these circumstances signals SN and SP will no longer alternate with each clock cycle. Rather, there will be a stream of SN pulses when Dq is low corresponding to the CCW direction, and there will be an absence of pulses when Dq is high (CW direction). In both of these situations, counter 256 will count up as noted by the Truth Table shown in FIG. 2.

As counter 256 increases, the gain control output signal D increases causing the bias control of converter 315 to increase. This in turn causes converter 315 to have a greater analog voltage output to digital input ratio. In turn, signal combining means 100 functions so the number of SN pulses during the low state of Dq decreases, and the number of SN pulses during the high state of Dq increases. This operation continues until equilibrium is achieved. Once achieved, counter 256 vacillates up and down to maintain equilibrium. At equilibrium, the SN and SP output pulses are valid with the dither component removed.

Lastly, consider the situation where there is a CW inertial rotation and the correction signal corresponds exactly to the number of pulses on signal lines P and N due to dither. In these circumstances, the number of SP pulses due to inertial rotation are very few relative to the movement of the dither cycle. Accordingly, the net positive pulses due to rotation occur on both halves of the dither cycle, i.e. CW and CCW direction. In these circumstances, the synchronous demodulator formed in part by the exclusive-OR gate 252 of FIG. 1 reverses the control of up/down counter 256 for each change in state of input Dq as noted in the corresponding Truth Table in FIG. 2. Therefore, the up/down counter on an average toggles with signal Dq. Accordingly, the gain control output signal D remains essentially stable.

The system of the present invention as just described provides a negative feedback control system to provide a sensor output signal substantially devoid of any dither signal component. A correction signal is generated as a function of any dither signal component in the sensor output signal. The correction signal is subtracted from the usual readout signal to provide the sensor output signal having the dither signal component due to dither motion removed.

It should be understood that dither reference signal R may not be in phase with the actual occurring contribution of pulses in signal lines P and N due to dithering. This would be equivalent to moving the reference signal R either to the left or to right while maintaining signals P and N fixed in FIG. 9. To obviate the effects of phase differences between signal R and the real dither signal component in the readout output signal values P and N, an automatic phase control may be added to the system as already described. This is particularly shown in FIG. 2. Circuit means 250B provides synchronous demodulation and integration like that provided in circuit means 250A. However, in circuit means 250B, exclusive-OR gate 272 compares signal SN and signal Di. Since signal Di is substantially in phase with the dither reference signal R, the value of the output counter 276 is indicative of the difference in the number of the SN and SP pulses. The output 280 of converter 278 is presented to the Y-input of multiplier 212 of circuit means 210. As the output of converter 280 increases or decreases, the phase of signal R may be advanced or retarded until the difference between the SN and the SP pulses are equal. An equality condition indicates that signal R is truly in phase with the dither signal component contained in signals N and P.

Thus, the circuit embodiment illustrated in FIGS. 2-10 sets forth both an automatic gain control and an automatic phase control for determination of correction signal E. Signal E may then be subtracted from readout signals N and P to provide the corrected readout signals SN and SP which then can be processed for sensor rotation angle and rate information.

While the system of the present invention has been disclosed in connection with a ring laser angular rate sensor, it should be appreciated that the system may be used for any such sensor having a closed-loop path having a pair of counter-propagating waves therein. The dither remover of the present invention operates in response to corrected readout signals so as to either separately or in combination apply the principles of generating a correction signal having both magnitude and phase in direct relationship to the dither signal component in the usual sensor readout signals.

While the present invention has been disclosed in connection with the preferred embodiment thereof, it should be understood that there may be other embodiments which fall within the spirit and scope of the invention as defined in the following claims. Specifically, there exists a wide range of analog and digital circuits which may be combined to perform various functions. Further, it should be understood, that the system as indicated in the FIGS. 2-10 may be combined, at least in part, by a microprocessor or microcomputer and the like.

The closed-loop correction scheme of the preferred embodiment utilizes two sensor output signal lines SN and SP synchronized with a clock signal such there exists a pulse for each clock pulse on either SP or SN signal lines but not both. Thus, the net pulse count:

SP−SN=Rotation Angle

However, as indicated earlier, a single signal line and a direction could also be used without departing from the spirit and scope of the present invention.

It should be recognized that signal P and N are asynchronous whereas signal SN and SP are synchronized with the clock signal. Accordingly, the closed-loop dither component remover scheme of the present invention may be practiced using asynchronous operation where new asynchronous output signal may be provided with the dither component removed.

The embodiments of the invention in which an exclusive property or right is claimed are defined as follows:

1. A dithered angular rate sensor comprising:
   means for generating counter-propagating waves along a closed-loop path, each of said waves having a frequency related to the rotation of said sensor;
   means for dithering the frequency of at least one of said waves;
   means coupled to said sensor for generating a first dither reference signal having phase and magnitude related to said dithering;
   first signal means, having means for receiving a phase control signal and said first dither reference signal, for producing a second dither reference signal shifted in phase relative to said first dither reference signal in response to said phase control signal;
   readout means responsive to said waves for producing at least one readout signal indicative of rotation of said sensor, said readout signal including a signal component do to said dithering;
   second signal means for combining said readout signal and at least one correction signal to produce at least one sensor output signal which is characteristic of the difference between said readout signal and said correction signal; and
   correction signal means including, converter means responsive to said second dither reference signal as a function of said second dither reference signal, said converter means having input means for receiving a converter control signal operative to affect the relationship between said second dither reference signal and said correction signal,
   control means responsive to any dither signal component in said sensor output signal for generating said converter control signal as a selected function of any dither signal component in said sensor output signal,
   third signal means responsive to said sensor output signal for providing said phase control signal as a selected function of any dither signal component in said sensor output signal, said phase control signal being operative to affect the phase of said second reference signal to alter the effective phase of said correction signal, and
   said converter means and said third signal means cooperating together to drive any dither signal component in said sensor output signal toward a minimum.

2. The sensor of claim 1 wherein:
said control means includes means for demodulating said sensor output signal as a selected function of said second dither reference signal and generating said converter control signal.

3. The sensor of claim 1 wherein said third signal means includes:
demodulator means for demodulating said sensor output signal as a selected function of said second dither reference signal, said demodulator means producing a second demodulator output signal indicative of said dither signal component in said sensor output signals; and
means for integrating said second demodulator output signal and providing said phase control signal representative of the integration thereof.

4. The apparatus of claim 2 wherein:
said control means includes,
synchronous demodulator means for demodulating said sensor output signal as a first selected function of said second dither reference signal, said synchronous demodulator means producing a first demodulator output signal indicative of said dither signal component in said sensor output signal, and
means for integrating said first demodulator output signal and providing said converter control signal representative of the integration thereof; and
said third signal means includes,
synchronous demodulator means for demodulating said sensor output signal as a second selected function of said second dither reference signal, said synchronous demodulator means producing a second demodulator output signal indicative of said dither signal component in said sensor output signal, and
means for integrating said second demodulator output signal and providing said phase control signal representative of the integration thereof

* * * * *